(12) United States Patent
Messenger

(10) Patent No.: US 11,485,281 B2
(45) Date of Patent: Nov. 1, 2022

(54) LIGHT ASSEMBLY, METHOD FOR REDUCING LIGHT LOSS, VEHICLE DESIGN ELEMENT AND REAR VIEW DEVICE

(71) Applicant: MOTHERSON INNOVATIONS COMPANY LIMITED, London (GB)

(72) Inventor: Jacob Heath Messenger, Lonsdale (AU)

(73) Assignee: Motherson Innovations Company Limited, London (GB)

( * ) Notice: Subject to any disclaimer, the term of this patent is extended or adjusted under 35 U.S.C. 154(b) by 102 days.

(21) Appl. No.: 16/804,602

(22) Filed: Feb. 28, 2020

(65) Prior Publication Data
US 2021/0061167 A1 Mar. 4, 2021

(30) Foreign Application Priority Data
Aug. 30, 2019 (DE) ...................... 10 2019 123 380.1

(51) Int. Cl.
*F21V 9/00* (2018.01)
*B60Q 1/50* (2006.01)
(Continued)

(52) U.S. Cl.
CPC ............. *B60Q 1/50* (2013.01); *B60Q 1/2696* (2013.01); *B60R 13/005* (2013.01); *F21V 5/04* (2013.01); *G02B 6/001* (2013.01); *G09F 13/04* (2013.01); *F21W 2104/00* (2018.01); *F21Y 2115/00* (2016.08)

(58) Field of Classification Search
CPC .......... F21S 43/26; F21S 43/14; F21S 43/249; F21V 13/04; F21V 5/04; G02B 5/128; B60Q 1/56; B60Q 3/64; B60Q 3/745; B60R 13/10
See application file for complete search history.

(56) References Cited

U.S. PATENT DOCUMENTS 1,430,845 A * 10/1922 Pease ...................... B60Q 1/56
40/205
2007/0058257 A1* 3/2007 Lynam .................. B60R 1/1207
359/604
(Continued)

FOREIGN PATENT DOCUMENTS

JP 08132989 A * 5/1996

OTHER PUBLICATIONS

IP.com English translation of JP 08132989 A (Year: 1996).*

Primary Examiner — Omar Rojas Cadima
(74) Attorney, Agent, or Firm — Jones Day

(57) ABSTRACT

A system includes at least one light pipe, at least one light source disposed at least partially within an interior of the system, a lens substantially enclosing the interior, the at least one light pipe, and the at least one light source, the lens having a continuous transparent or translucent coating on the outer surface, with the at least one light source receiving electrical power from the electrical power source, the continuous transparent or translucent coating being at least partially permeable to at least some light which is emitted by the at least one light source and passed through the lens, and at least one mask located between the at least one light pipe and the lens, a plurality of small contact areas being provided on the outside or inside of the light pipe or on the mask.

9 Claims, 3 Drawing Sheets

(51) Int. Cl.
*F21V 8/00* (2006.01)
*F21V 5/04* (2006.01)
*B60Q 1/26* (2006.01)
*G09F 13/04* (2006.01)
*B60R 13/00* (2006.01)
*F21Y 115/00* (2016.01)
*F21W 104/00* (2018.01)

(56) References Cited

U.S. PATENT DOCUMENTS

| | | | |
|---|---|---|---|
| 2009/0300953 A1* | 12/2009 | Frisch | B60R 13/10 40/204 |
| 2015/0197180 A1* | 7/2015 | Salter | G09F 13/08 362/510 |
| 2015/0338054 A1* | 11/2015 | Kim | F21S 43/26 362/509 |

* cited by examiner

LIGHT ASSEMBLY, METHOD FOR REDUCING LIGHT LOSS, VEHICLE DESIGN ELEMENT AND REAR VIEW DEVICE

CROSS-REFERENCE TO RELATED APPLICATION

This application claims the benefit of foreign priority to German Application No. 10 2019 123 380.1, filed Aug. 20, 2019, which is hereby incorporated by reference in its entirety for all purposes.

BACKGROUND

1. Field of the Invention

The present disclosure relates to a system comprising a lighting assembly for a design element, in particular configured for a vehicle design element selected from vehicle emblems, badges, logos and the like, and/or other vehicular light components, such as in rear view devices. The system may provide a uniform light output without the use of light guide optic features and without the light source being viewable. In addition, the present disclosure refers to a system in which light loss within light pipes used in such systems is reduced by internal reflection methods with velvet materials. The present disclosure also refers to a method for reducing light loss, vehicle design element and rear view device.

2. Related Art

Vehicles, such as passenger cars, vans and trucks, include various interior and exterior vehicular lighting components capable of emitting light for various purposes. Additionally, such aforementioned vehicles often include various interior and exterior vehicular components having a metallic reflective coating coated thereon exhibiting a chrome or mirror-like surface finish. In such systems it is desirable that the overall number of visible lighting components is reduced. Metallic reflective coatings which provide such features are known from, for example, WO 2011/075796 and WO 2013/110122.

For example, an aesthetic feature which has become desirable in automotive applications is to provide exterior and/or interior badges and/or emblems on vehicles or specific parts of a vehicle. Such aesthetic features are backlighting of key features of the particular badge or emblem or are illuminated for optical or safety aspects. For example, parts or all of door finishers may be illuminated in such a way. It is desirable that these elements are backlit with an even (uniform or homogenous) luminance using, for example light emitting diodes (LEDs) input. An LED is a directional light source having a relative luminous intensity that decreases as the viewing angle is increased. This may result in the appearance of bright or hot spots to an external viewer of the badge.

Lighting systems that provide a uniform luminous intensity are known, for example systems using organic light emitting diode (OLED) technology or complex lens and reflector arrangements. Highly diffusing materials are also used but these have the drawback of giving a milky or hazy appearance and have poor optical efficiency. Optic features may also be used on clear materials to diffuse light, but these have the drawback that the optic features are visible in the unlit state which is undesirable. A further desirable feature is that the LED input is not directly visible to the external viewer of the badge or emblem.

Light pipes are used in such systems to deliver the light from a light source over distances to the place of illumination. Thereby light pipes rely on total internal reflection such that ideally the light pipe is in total free space with no mounting features. Any mounting feature may lower efficiency. Due to this it is problematic to construct low thickness assemblies as a large amount of clearance is required to ensure that no contact is made which may remove the internal reflection and therefore causing defects. Any location features that are used must be placed in areas where they cause minimal impact with regard to the light distribution. This causes the light pipe position to be compromised and the overall system to be larger. US 2013/0336004 describes a flexible light guide having a rough surface but is silent about light loss due to refraction.

SUMMARY

In an aspect, a system includes a lighting assembly for a design element, in particular configured for a vehicle design element, is provided comprising at least one light pipe; at least one light source disposed at least partially within an interior of the system, wherein the at least one light source is configured to emit light based on at least receiving electrical power from an electrical power source, wherein the at least one light source being arranged adjacent to and directed towards the at least one light pipe; a lens substantially enclosing the interior, the at least one light pipe and the at least one light source, the lens having an inner surface, an outer surface disposed opposite the inner surface and a continuous transparent and/or translucent coating on the outer surface, wherein with the at least one light source receiving electrical power from the electrical power source, the continuous transparent and/or translucent coating is at least partially permeable to at least some light which is emitted by the at least one light source and passed through the lens; and at least one mask located between the at least one light pipe and the lens; wherein a plurality of small contact areas are provided on the outside and/or inside of the light pipe and/or on the mask in order to contain the light within the at least one light pipe.

In another aspect, a method for reducing light loss within a light pipe includes providing small contact areas on or within a light pipe.

In another aspect, a vehicle design element includes the system.

In another aspect, a rear view mirror device includes the system.

The system according to an example of the invention is a system in which the interior of the system, for example the light source, light guide etc., which is switchable between an on state and an off state, is hidden until illumination is turned on so that the light produced in the inside of the system can be seen from outside ("Hidden Till Lit" (HTL)). Thus, for example, any logo or emblem which was hidden will be visible only then.

This HTL feature of the system may be provided by a transparent and/or translucent coating applied to the lens, either on the outside or the inside. Preferably the coating is provided on the outside of the lens. Such transparent and/or translucent coating is a coating that has a certain reflectivity so that, for example, the light source or light pipe cannot be seen from one side but that has also a certain degree of translucence so that the light from the light source and/or the light pipe can be seen once lit.

In embodiments of the present invention, the front surface of the lens is a polished, textured or machined surface. When the transparent and/or translucent coating is deposited on a polished, textured or machined substrate surface it provides a visible surface that is either a highly polished metal looking surface or a textured metal surface that replicates metal finishing, for example brushed stainless steel.

The lens may be made out of clear and/or translucent polymeric material. The polymeric material may be formed from a material selected from the group of polyacrylate, polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these, but is not limited thereto. For example, the lens may be formed from a material selected from the group of polycarbonate, poly(2,2'-dihydroxyphenylpropane) carbonate, polydiethyleneglycol bis(allyl carbonate), polymethylmethacrylate and polystyrene, or blends thereof.

The present disclosure also proposes that the lens may have an outer component, preferably made from a clear material mentioned above, and an inner component, preferably over molded on the inner surface of the outer component and/or made from opaque material. The lens inner component material optic properties can be selected to additionally increase or decrease the reflected light back into the light pipe. A highly reflective material will increase the final light output level, a non-reflective material will reduce the overall final light output level.

The lens may be formed by any process known in the art, such as, for example, injection molding and/or thermoforming, but is not limited thereto.

The lens may include a pre-coated film in the form of either a hardcoat, a silicon hardcoat, an inorganic oxide, or a thin metal film, or a combination of such pre-coated films.

The transparent and/or translucent coating may be any coating that provides the desired HTL functionality. For example, the transparent and/or translucent coating may be a transparent and/or translucent metal layer formed from a metal, alloy or conductive metalloid selected from the group consisting of chromium, aluminum, titanium, nickel, molybdenum, zirconium, tungsten, niobium, tantalum, cobalt, manganese, silver, zinc, silicon, and mixtures thereof; an oxide, nitride, boride or carbide thereof and mixtures thereof, and/or alloys of any of the aforementioned metals, steel, stainless steel, or silicon. In one embodiment, the transparent and/or translucent coating is a chromium-based reflective coating, and both the polymeric substrate and the chromium-based reflective coating are at least in part permeable to light originating from the at least one light pipe.

For example, the transparent and/or translucent coating may be an alloy of chromium and a dopant material, the dopant material being selected from the hexagonally close-packed transition metals, the alloy having a crystal structure of a primary body-centered cubic phase in coexistence with a secondary omega hexagonally close-packed phase. The alloy may be a binary alloy of chromium and the dopant material.

The atomic percentage of the dopant material in the binary alloy may range from about 1.9 at. % to about 5.8 at. %. The dopant material may be selected from hexagonally close-packed transition metals zirconium, titanium, cobalt, hafnium, rubidium, yttrium and osmium. In one embodiment the dopant material may be selected from hexagonally close-packed transition metals zirconium, titanium and cobalt. For example, the alloy may be a binary alloy and the dopant material is zirconium where the atomic percentage of the zirconium in the binary alloy is in the range of from about 4.5 at. % to about 5.8 at. %. In a further embodiment, the alloy may be a binary alloy and the dopant material may be titanium, and where the atomic percentage of the titanium in the binary alloy is in the range of from about 1.9 at. % to about 5.8 at. %. In a still further embodiment, the alloy may be a binary alloy and the dopant material may be cobalt, where the atomic percentage of the cobalt in the binary alloy may be in the range of from about 1.9 at. % to 5.7 at. %.

The coating may have a thickness of 200 nm, 100 nm, be in the range of from 40 nm to 80 nm, be in the range of from 50 nm to 70 nm, or be about 60 nm, but is not limited to.

The coating may have a minimum light transmission of 5% to a maximum of 100%. In some embodiments, the light transmission of the coating is from 5% to 20%. The light transmission of the transparent and/or translucent coating may be 5%, 6%, 7%, 8%, 9%, 10%, 11%, 12%, 13%, 14%, 15%, 16%, 17%, 18%, 19% or 20%. In specific embodiments, the light transmission of the transparent and/or translucent coating is about 8%. The transmission may depend on the coating used and thus can be adjusted.

The transparent or translucent coating may be part of a multilayer transparent and/or translucent stack on the front surface of the lens. The multilayer stack may comprise other layers such as hardcoat layers, and the like. For example, a hardcoat can be applied to the lens either on top of the transparent and/or translucent coating or between the lens and the transparent and/or translucent coating. The hardcoat may be formed from one or more abrasion resistant layers. As is known in the art, a primer layer may be used between the hard coat and the lens or the transparent and/or translucent coating to enhance adhesion of the hard coat. The hardcoat can be formed from one or more of a range of materials known for this purpose in the art, including an organo-silicon, an acrylic, a urethane, a melamine or an amorphous organosilicon ($SiO_xC_yH_z$). Organosilicon hardcoats are particularly suitable and suitable materials include Silicone Hard Coat SHC 5020 from Momentive and GE587B from MomentiveGE Bayer. The hardcoat material may be applied in a solvent, such as an alcohol solvent. The hardcoat can be applied using any of the coating techniques known in the art, including flow coating, dip coating, spray coating, spin coating, etc. and then cured using techniques known in the art, such as heating to a temperature of about 100° C. to about 200° C. for the appropriate required period of time. Intermediate layers may be deposited between the respective layers of the multilayer stack. The intermediate layers may assist in adhesion between the respective layers and minimize or prevent delamination. The intermediate layers will generally be translucent and may be formed from silica.

The transparent and/or translucent coating can be deposited using any suitable elemental deposition technique, including Physical Vapor Deposition (PVD), Chemical Vapor Deposition (CVD), or the like.

For example, the lens may be positioned in one or more sputter deposition chambers with either planar or rotary magnetron targets, and with deposition of the transparent and/or translucent coating being achieved via DC sputtering from an elemental target. Other processes for applying or depositing coating layers can also be used. The thickness of the layer will determine the transparency and/or translucency of the layer. In one embodiment, a thickness of 2 nm to 50 nm provides a conductive transparent and/or translucent layer that allows sufficient light to pass through. A thickness of about 30 nm is particularly suitable.

The at least one light source may be any light source that can be used to provide the required amount of light, either light of one color or lights of different color. According to the invention at least one light source may be used, wherein two or more light sources may also be encompassed by the present invention. For example, if two or more light sources are used, each light source may provide light in a different color and/or in a different brightness.

The light source may be any suitable light source applicable for the intended purpose. In one embodiment of the invention, the light source comprises at least one LED lamp to illuminate the light pipe. Here, the at least one LED lamp could be arranged at one end of the light pipe, to radiate light into the light pipe. The light is then radiated away from the light pipe along the length of the light pipe. In one embodiment, two or more LED lamps are employed, where at each end of the light pipe one LED lamp is located.

The light source may comprises one or more LED's, one or more OLED's, a similar display technology, a surface lit plastic sheet, such as Acrylite® (Evonik Industries), or any combination thereof. The at least one light source may be attached to a printed circuit board (PCB). The printed circuit board can include additional light sources, optionally positioned adjacent to light receiving surfaces to direct light into the light pipe. Generally, the light source is hidden and cannot be seen from the outside. The at least one light source may be electrically-connected to the vehicle and is configured to emit light based on at least receiving electrical power from the vehicle, such as from an electrical power source (e.g. vehicle electrical system, battery, etc.) on the vehicle. As non-limiting examples, the at least one light source may be electrically-connected to the vehicle by way of one or more wiring harnesses or other suitable electrical connectors as may be understood by the skilled person.

Generally, the at least one light source is arranged adjacent to and directed towards the light pipe. Other locations and directions of the light source are possible and within the skilled persons knowledge. The at least one light source, while unlit and emitting no light, is advantageously concealed behind the transparent and/or translucent coating coated on the lens.

The at least one light pipe is a light pipe generally used in automotive applications. With the invention it is proposed that the light pipe is substantially transparent and without any visible discrete optic features in an un-lit state, while being diffusive in a lit state. But the light pipe annulus can also be substantially transparent and non-diffusive in both a lit and un-lit state, while the circumferential flanges or cylinders are substantially transparent in an un-lit state, while being diffusive in a lit state.

In one embodiment of the invention, the light pipe comprises a clear polymeric material. The clear polymeric material may be selected from the group consisting of polyacrylate, such as poly(methyl methacrylate) (PMMA), polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these. Preferred substrate materials include polycarbonate, poly(2,2'-dihydroxyphenylpropane) carbonate, polydiethyleneglycol bis(allylcarbonate), polymethylmethacrylate and polystyrene, or blends thereof. In one embodiment the light pipe is made from PMMA. Here, the term "light pipe" can be used to refer to a tubular structure that is adapted to transport light. Light might be coupled into the light pipe at one, or at both ends of the light pipe. The light is then being radiated from the light pipe along its length, or at least along part of its length. Tubular is not limited to a round cross section, but can also be a quadrilateral and can change in cross section, if done smoothly to not lose light.

According to the invention at least one light pipe may be used in the system, wherein for example 1, 2, 3, 4 or more light pipes may also be used. In one embodiment one light pipe is used.

In one embodiment of the invention, the at least one light pipe may be adapted to sequentially radiate the light from the at least one light source. In the description the term "sequentially" can be used to refer to a light sweep effect. For example, light might sweep from the center of the vehicle outwards to promote direction of travel, where the light has the appearance of a continuous even illumination. Therefore, the light pipe could comprise reflecting and/or diffusing elements for creating the light sweep effect.

In one embodiment, the housing behind the light guide is shaped to promote reflection of light back into the adjacent environment.

A mask within the inventive system may provide the desired pattern of illumination for the system. Generally, the mask is a kind of a stencil that has translucent and non-translucent zones, wherein the former allow light transmission from the at least one light source therethrough, so that only a specific pattern is illuminated once light from the at least one light source and/or the at least one light pipe is applied to the mask. For example, the pattern may be printed or lasered onto the mask, wherein any printing technique may be used to prepare the desired pattern. Etching processes known in the art could also be used for this purpose. The pattern or image is a dedicated part that the stencil is placed on.

According to various aspects and in examples of the present disclosure, a system is provided in which the chances of light loss within the light pipe due to refraction is reduced and/or eliminated. This is achieved by small contact areas located inside and/or outsight of the light pipe and/or the mask. These contact areas help to contain the light within the light pipe. In order for the light to refract or escape from within the light pipe it has to hit the exact point of the contact area. Depending on the size of the contact areas the possibility thereof is limited or decreased. This increases the probability of the light to be kept within the light pipe.

The contact areas may be small enough that a person cannot see them from a desired viewing distance but should have a size sufficient to provide the refractive effect. In one embodiment the contact areas on the mask have a size that cannot be seen from the outside as light shines through them and would not look homogenous if the areas are large enough to be seen. In case the contact areas are too small it may not provide the required gap (when assembled the light pipe just deforms around the contact spots). The skilled person will be in the position to determine the desired size of the contact areas depending on the respective use. In one embodiment the size of the contact areas is in the range of 0.01-1 mm, such as 0.01-0.5 mm. The size may be measured in line length or diameter of contact spots.

The contact areas can be formed in several different ways and at several different locations of the system. In one embodiment the contact areas are formed by applying a film of a suitable material onto the light pipe and/or the mask. The film may be located on the entire light pipe and/or mask or may be located on selected and/or preferred locations of the light pipe and/or the mask. The material of the film may be selected from light scattering and/or light reflecting materials. The material preferably has the properties of a velvet film. Suitable materials may be, but are not limited to, polymers such as polyesters, polyurethane, poly(meth)acrylates, metals, metal alloys, metal salts, or mixtures thereof. Examples of suitable materials are polyethyleneterephthalat (PET) and polycarbonate (PC).

In another embodiment the contact areas are formed by providing a velvet surface finish on the light pipe and/or the mask.

Light scattering particles, for example, may be used in the bulk material of the light pipe and if further necessary for the small contact areas. Examples of such particles may be, but are not limited to, titanium dioxide, chromium oxide, or other metal oxides or salts. The particles may be of sufficient size and concentration such that the light pipe still appears transparent when un-lit while providing a substantially uniform luminous intensity surface output when lit.

In another embodiment the contact areas may be formed during any molding or casting process in the preparation of the inventive system. For example, a finish provided by a grain or sand blast may be applied to molded and/or cast parts, such as the light pipe and/or the mask. Other techniques to apply a suitable structure, especially a velvet surface finish, are known by the skilled person.

Having many contact points, as described in examples of the present disclosure, has the advantage of allowing the light pipe to be very close to the external surface of the inventive system. The light pipe can be a freeform. The light pipe can be flexible. This allows the light source not to appear too deep below the surface, wherein the view angle is increased and the appearance is more pleasing.

Additionally, focusing optical geometry may be included in the system to increase the amount of reflected light rays back into the light pipe. This geometry can be varied around the circumference of the light pipe to improve the homogeneity of the overall light output of the light assembly.

The light pipe may optionally comprise a reflector layer on the outside. Such a reflector layer may increase the efficiency with which the light is guided through the light pipe. In one embodiment the reflector is a white reflector. It is also possible that the small contact areas be provided on the reflector layer.

In one embodiment, a gasket may be part of the system. The gasket may be positioned at the inside of the system next to the light pipe. The gasket may push the parts of the system against the lens to keep the light pipe as close as possible to the outside surface. The gasket may additionally and/or exclusively be located between the light pipe and the mask, preferably surrounding the edges of the mask.

A method of reducing light loss within a light pipe may include providing small contact areas on or within the light pipe and/or on a surface of an element in direct vicinity to the light pipe. The material for providing the small contact areas may be applied with conventional techniques known to the skilled person.

A vehicle design element may include the system.

The system may be used in other vehicle components, such as rear view devices. For example, the system may be comprised by a housing for a side turn indicator of a rear view device of a vehicle with the side turn indicator comprising at least one light element.

A side turn indicator may be arranged below the surface the transparent and/or translucent coating or comprise at least part of said surface. In one specific embodiment, light originating from a light source of the side turn indicator may shine through the surface of the coating.

In one embodiment, the system may be used as a door finisher for automotive doors or any other part of the vehicle.

BRIEF DESCRIPTION OF THE DRAWINGS

Embodiments of the present invention will be discussed with reference to the accompanying drawings, wherein.

DETAILED DESCRIPTION

Figure 1A:
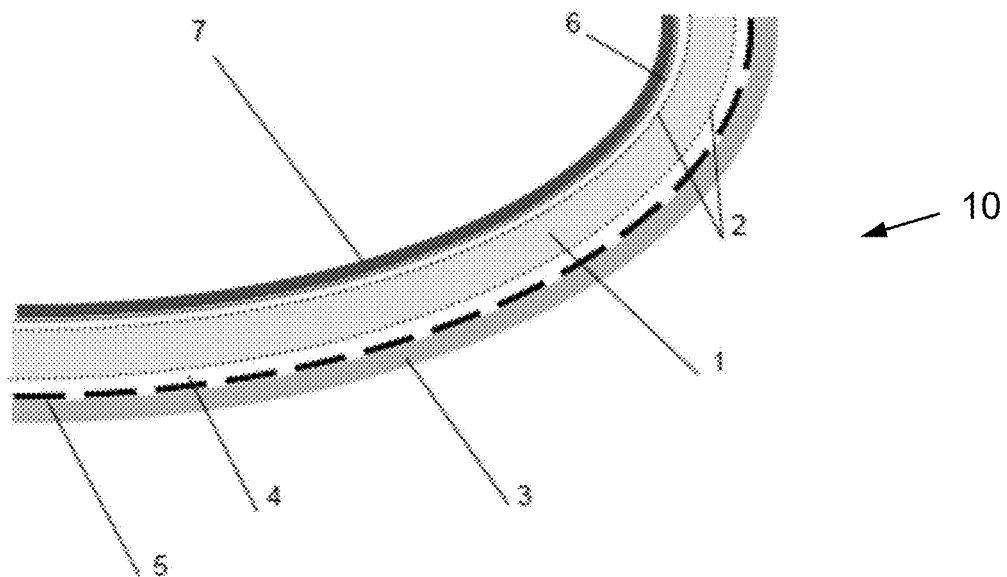
FIG. 1A is a schematic view of a system including an assembly according to an embodiment of the invention.

Referring now to FIG. 1A, there is shown a schematic lighting assembly of a system 10, which has a light pipe 1, a light source, a mask 4 with an image/artwork 5 and a lens 3. The lens 3 comprises a transparent and/or translucent metal layer which, in use, is translucent. The light source is switchable between an on state in which the image 5 is visible on the front surface of the lens 3 and an off state in which no image is visible on the front surface of the lens. The system 10 also encompasses an reflector 6 (such as a white reflector) and a gasket 7.

Figure 1B:
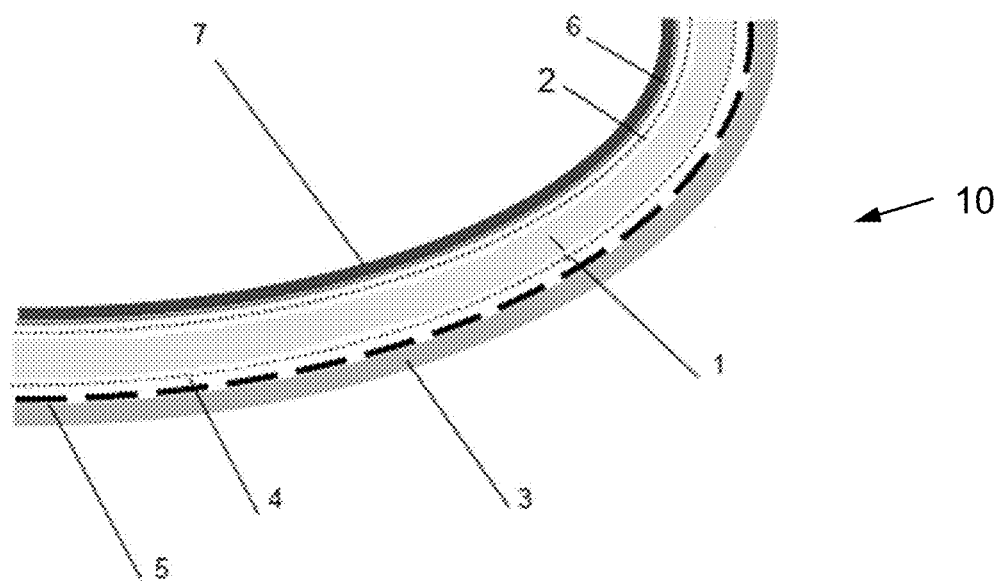
FIG. 1B is a schematic view of a system including an assembly according to another embodiment of the invention.

According to an example, contact areas 2 are provided on the reflector and on the mask 4 in order to reduce the light loss in the light pipe 1. These small contact areas 2 could also be on the light pipe 1 in addition to the current parts or on both. The system 10 provides light output such that a viewer would see a homogenous annular light output. In the embodiment of FIG. 1A, the small contact areas are shown on the light pipe 1, and in the embodiment of FIG. 1B, the small contact areas are shown on the mask 4 and/or the reflector 6.

Figure 2:
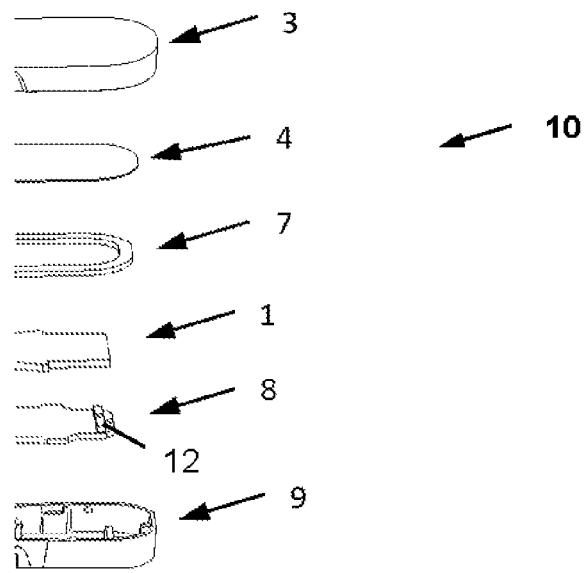
FIG. 2 is a schematic view of a system including an assembly according to an embodiment of the invention for a facia finisher.

FIG. 2 shows a system 10 used for a facia finisher. The optically clear polycarbonate lens 3 is formed by injection moulding, but other processing methods could be used such as thermoforming clear polycarbonate sheet. As in FIGS. 1A and 1B, the lens 3 has a coating of a transparent and/or translucent metal layer which, in use, is translucent. The coating has a certain amount of light transmission that allows visible light to pass through the lens.

The mask 4 is a clear film with opaque ink. The opaque ink is laser ablated or screen printed to form clear areas of artwork 5. Light can pass through these clear areas to form the illuminated pattern that a person can view.

The gasket 7 creates a preload between a housing 9 and the lens 3 to prevent any rattles and also provides light blocking so that light does not pass through unintended areas.

The light guide 1, or light pipe, capture the light from the entry points of a light source 12 for the illumination of the assembly, like the LED's 12 arranged on a printed circuit board 8 containing the LED's 12.

The light guide 1 contains dispersive particles, which scatter the light out of the light guide surfaces that are under the lens 3. This creates homogenous illumination of the surface of the light guide 1. The particles are not shown, since they are microscopic and are an additive to the material of the light pipe.

The housing 9 attaches to the lens 3 and provides location for the internal components mentioned before. The housing 9 encloses the assembly and stops light from escaping in unintended areas.

Figure 1C:
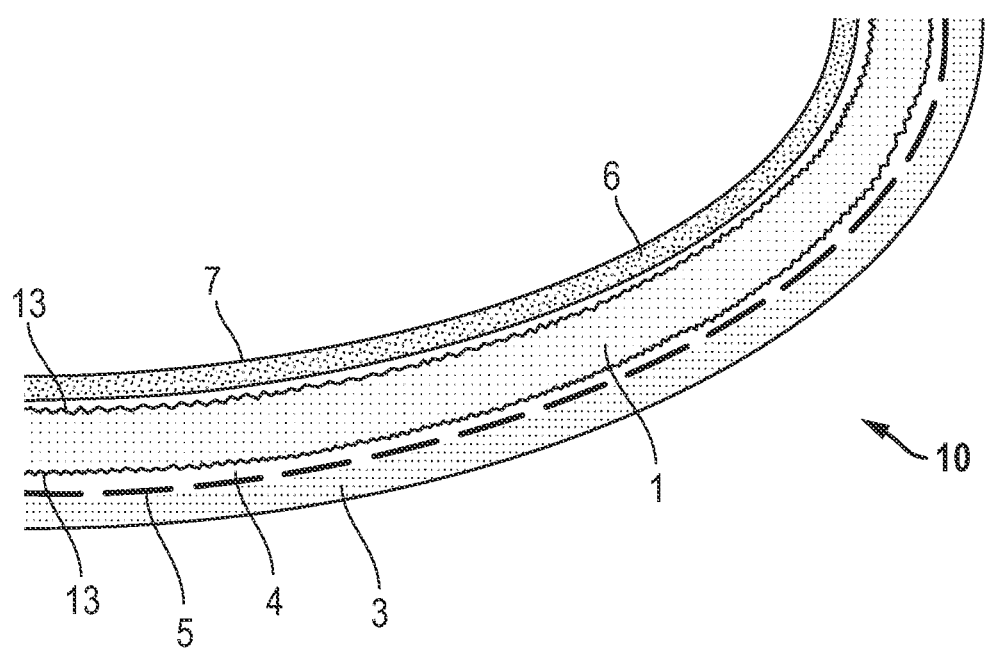
FIG. 1C illustrates a mask material having a velvet surface finish.
Figure 3:
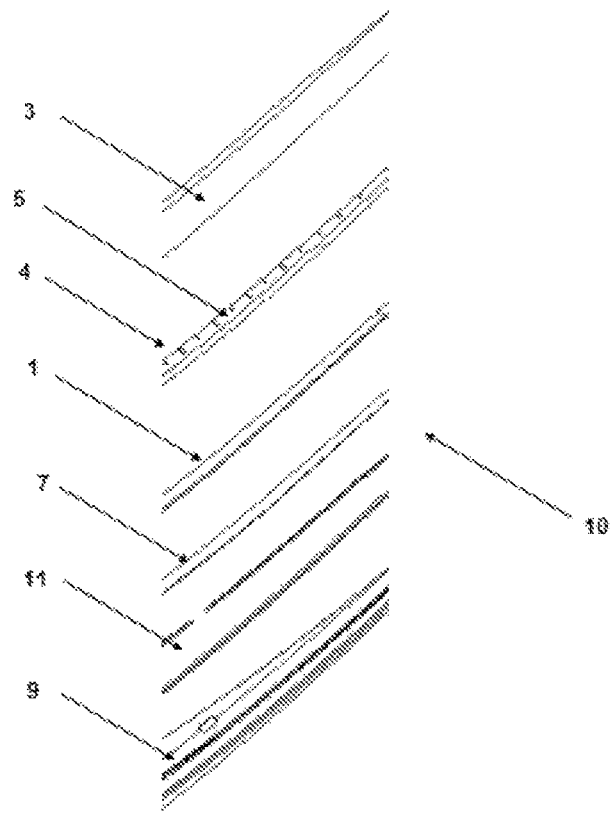
FIG. 3 is a schematic view of a system including an assembly according to an embodiment of the invention for a door finisher.

FIG. 3 shows a system 10 used for a door finisher. The lens 3 has a coating with a certain amount of light transmission that allows visible light to pass through the lens 3. The mask 4 is a thermoformed clear film with opaque ink. The opaque ink is laser ablated or screen printed to form clear areas of artwork 5. The mask 4 material has a "velvet" surface finish 13, as is shown in FIG. 1C. The velvet surface finish 13 of mask 4 provides a plurality of small contact areas on the surface of the mask 4.

The light guide 1 captures the light from the entry points of the LED's and contains dispersive particles which scatter the light out of the light guide surfaces that are under the lens 3. This creates homogenous illumination of the light guide surface. If the light guide 1 is provided with a velvet surface finish 13, the velvet surface finish 13 of the light guide 1 provides a plurality of small contact areas on the surface of the light guide 1.

The gasket 7 creates a preload between the housing 9, the lens 3 and the light pipe 1 to prevent any rattles. The reflector is white to increase efficiency of the lighting system. The reflector may also have a velvet surface finish 13 to allow the light guide 1 to be placed in direct contact with the mask 4. The velvet surface finish 13 of the reflector provides a plurality of small contact areas on the surface of the reflector. The velvet surface finish 13 provides space between the adjacent components increasing internal reflection due to the air gap.

The housing 9 attaches to the lens 3 and provides location for the internal components. It has clips and locator holes and screw holes that are used to attach the assembly to the vehicle. An adhesive 11 joins the housing 9 to the lens assembly.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

REFERENCE SIGNS 1 light pipe/light guide
2 contact areas
3 lens
4 mask
5 image/artwork
6 reflector layer
7 gasket
8 printed circuit board
9 housing
10 Hidden Till Lit (HTL) system
11 adhesive
12 light source
13 velvet surface finish.

What is claimed is:

1. A system comprising a lighting assembly for a vehicle design element, comprising:
    at least one light pipe;
    at least one light source disposed at least partially within an interior of the system, the at least one light source being configured to emit light based on at least receiving electrical power from an electrical power source, and the at least one light source being arranged adjacent to and directed towards the at least one light pipe;
    a lens substantially enclosing the interior, the at least one light pipe, and the at least one light source, the lens having an inner surface, an outer surface disposed opposite the inner surface and a continuous transparent or translucent coating on the outer surface for providing a hidden until lit appearance, wherein with the at least one light source receiving electrical power from the electrical power source, the continuous transparent or translucent coating is at least partially permeable to at least some light which is emitted by the at least one light source and passed through the lens;
    at least one reflector configured to increase the efficiency with which the light is guided through the at least one light pipe and
    at least one mask, configured to provide a pattern of illumination for the system, located between the at least one light pipe and the lens and arranged on an opposite side of the at least one light pipe compared to the reflector,
    wherein a plurality of small contact areas are provided on (i) an outside and an inside of the at least one light pipe, or (ii) on the at least one mask and at least one reflector, in order to contain light within the at least one light pipe,
    wherein the plurality of small contact areas are formed by applying a velvet film or by providing a velvet surface finish on the at least one light pipe or on the at least one mask, and
    wherein the lighting assembly is enclosed within a facia finisher or a door finisher.

2. The system of claim 1, further comprising at least one gasket located at the interior of the system.

3. The system of claim 1, wherein the at least one reflector is on the outside of the at least one light pipe.

4. The system of claim 1, wherein the at least one light source comprises at least one of an incandescent light source, light-emitting diodes (LEDs), organic light-emitting diodes (OLED) or a combination thereof, wherein the at least one light source is located on a circuit board.

5. The system of claim 1, wherein the lens comprises an outer component made from a clear material, and an inner component which is at least one of over molded on an inner surface of the outer component or made from opaque material.

6. The system of claim 1, wherein the transparent or translucent coating is a metal coating, and the metal coating is a chromium-based reflective coating.

7. The system of claim 1, wherein the at least one light pipe contains light scattering particles.

8. A vehicle design element comprising the system of claim 1.

9. A rear view device of a vehicle comprising the system of claim 1.

\* \* \* \* \*